(12) United States Patent
Infanti et al.

(10) Patent No.: US 7,970,726 B2
(45) Date of Patent: Jun. 28, 2011

(54) APPARATUS, AND AN ASSOCIATED METHOD, FOR QUANTIFYING A QUALITY OF A USE CASE

(75) Inventors: Luis E. Infanti, Buenos Aires (AR); Agustina Shinji, Buenos Aires (AR); Juan Pablo Pozzoli, Buenos Aires (AR)

(73) Assignee: Hewlett-Packard Development Company, L.P., Houston, TX (US)

( * ) Notice: Subject to any disclaimer, the term of this patent is extended or adjusted under 35 U.S.C. 154(b) by 670 days.

(21) Appl. No.: 12/118,361

(22) Filed: May 9, 2008

(65) Prior Publication Data
US 2009/0281968 A1    Nov. 12, 2009

(51) Int. Cl.
*G06F 17/00* (2006.01)
*G06N 5/02* (2006.01)

(52) U.S. Cl. ........................................... 706/47

(58) Field of Classification Search ...................... 706/47
See application file for complete search history.

(56) References Cited

U.S. PATENT DOCUMENTS

| | | | |
|---|---|---|---|
| 6,694,505 B1 * | 2/2004 | Tan | 717/100 |
| 6,792,431 B2 * | 9/2004 | Tamboli et al. | 1/1 |
| 6,834,195 B2 * | 12/2004 | Brandenberg et al. | 455/456.3 |
| 7,003,766 B1 * | 2/2006 | Hong | 717/144 |
| 7,257,594 B2 * | 8/2007 | Tamboli et al. | 1/1 |
| 7,424,701 B2 * | 9/2008 | Kendall et al. | 717/105 |
| 7,580,946 B2 * | 8/2009 | Mansour et al. | 1/1 |

OTHER PUBLICATIONS

An efficient approach to rule redundancy reduction in hierarchical phrase-based translation, Licheng Fang; Chengqing Zong; Natural Language Processing and Knowledge Engineering, 2008. NLP-KE '08. International Conference on Digital Object Identifier: 10.1109/NLPKE.2008.4906773 Publication Year: 2008 , pp. 1-6.*

Learning Method for Extraction of Partial Correspondence from Parallel Corpus, Terashima, H.; Echizen-ya, H.; Araki, K.; Asian Language Processing, 2009. IALP '09. International Conference on Digital Object Identifier: 10.1109/IALP.2009.69 Publication Year: 2009 , pp. 293-298.*

Overlapping phrase-level translation rules in an SMT engine, Tribble, A.; Vogel, S.; Waibel, A.; Natural Language Processing and Knowledge Engineering, 2003. Proceedings. 2003 International Conference on Digital Object Identifier: 10.1109/NLPKE.2003.1275971 Publication Year: 2003 , pp. 574-579.*

Extracting Meaning from Abbreviated Identifiers, Lawrie, D.; Feild, H.; Binkley, D.; Source Code Analysis and Manipulation, 2007. SCAM 2007. Seventh IEEE International Working Conference on Digital Object Identifier: 10.1109/SCAM.2007.17 Publication Year: 2007 , pp. 213-222.*

* cited by examiner

*Primary Examiner* — Michael Holmes

(57) ABSTRACT

A use case quality index tool, and an associated method, analyzes the specifications of use cases. Determinations are made of conformity of a use case with use-case quality rules. And, a calculator calculates a use case quality index value that quantifies the conformity of the use case to the use-case quality rules.

20 Claims, 12 Drawing Sheets

156

Review

| 1- Use Case specification structure | ▼ |

⬅ | ➡ | 🏠

1.b) All cross references to other Use Cases exist and are correct (includes and extends)

Rule description:
This item validates that each reference in a given Use Case identifies an existing Use Case, in a unique way

*Mark non compliance*

[                                    ]
[                                    ]
[                                    ]
[                             💾  ✖  ]

*See examples*
A step in the flow of events of a Use Case references another Use Case in a confused way: "step extended by the Use Case where the cut request is created". It is not clear that the Use Case referenced is "Submit Test Sample cut request".

| Current UCQI value | 6.75 |
| 1.b) Non-compliances | 2 | » |

FIG. 9

Comment [JPP27]: 1.b Use Case 23 does not exist in the model.

1 - Use Case specification structure
a - The Use Case name expresses ...
b - All cross references to other Use ...
c - All extension points reference Use ...
d - The Use Case is independent ...
e - The Use Case does not contain ...
f - The Use Case is really a Use Case...

176

172

[ UC23 - Validate certificate ]

UC29 - Promote certificate

Review rules
1 - Use Case specification structure ▲
2 - Pre and Post-conditions ▲
3 - Flow of events' structure ▲
4 - Language ▲
5 - Abbreviations, Acronyms and Terms ▲
6 - Design ▲
7 - Errors and Exceptions ▲
8 - Business rules ▲
9 - Non functional requirements ▲
10 - General content ▲
11 - Analysis classes ▲
12 - Others ▲

Administration
Update non-compliance comment
Delete non-compliance

Non-compliances report

188

Project: X76
Use Case: Create certificate
Inspector: John Doe
Date: 05/23/2007

1 - Use Case specification structure

1.b) - Use Case 23 does not exist in the model.
1.b) - Use Case 129 does not exist in the model.

Category 1 total: 2

2 - Pre and Post-conditions

Category 2 total: 0

3 - Flow of events' structure

3.c) - The flow of events is alternative to alternative flow of events 3. Too much depth.

*
*
*
*
*

Category 3 total: 1

REPORT

FIG. 12

Reports

186

Categories

1 - Non-compliances report
2 - Summary report

| Current UCQI value | 6.75 |
|---|---|
| Total Non-compliances | 25 |

UCQI TOOL BAR

APPARATUS, AND AN ASSOCIATED METHOD, FOR QUANTIFYING A QUALITY OF A USE CASE

The present invention relates generally to a manner by which to quantify the quality of a use case that specifies a software, or other system, development requirement. More particularly, the present invention relates to an apparatus, and an associated method, by which to determine a use case quality.

Use-case quality rules that quantify acceptable, use-case characteristics are accessed. A determination is made as to whether the use case conforms to the use-case quality rules. And, a use case quality index is calculated responsive to the determination. The use case quality index is a quantification that indicates the extent to which the use case conforms to the use-case quality rules.

BACKGROUND OF THE INVENTION

Use of computer systems is pervasive throughout much of modern society. While use of, and access to, computer systems in prior years was limited, technological advancements have permitted computer devices to be of increasingly-large processing and storage capabilities while, at the same time, of significantly decreased costs. Their use is now not only pervasive but likely to be more so in the future.

A computer system is typically formed of one or more computer devices whose operation involves the execution of computer software, i.e. algorithms. The computer software manipulates data during its execution, and processed data is formed. Outputs are generated in response to, or formed of, the processed data. Computer system operation can become quite complex particularly when multiple computer devices separately operate and interact. Even relatively simple software generally requires thousands of lines of source code and operates to perform many different tasks and many different possible outcomes and outputs.

Development of a computer system, or software to be run on a computer system, requires significant amount of planning, not only best to ensure successful development but, also, development within estimated budget. Computer system and software development planning sometimes makes use of use cases in the planning of a computer system or software project. Most simply, a use case comprises a specification that provides a description of sequences of events that, taken together, lead to an action taken by a computer system. A use case typically describes the interaction between an initiator of an interaction and the system to achieve a system goal. And, typically, a use case comprises a complete series of events, described from the perspective of the primary actor. And, a use case includes, e.g., a use case name, a version, a statement of a goal, a summary, a list of actors, a list of preconditions, a list of triggers, a description of a basic course of events, a list of alternative paths, past conditions, business rules, and any other desired information. A separate use case is typically created for each separate goal that is to be provided by the resultant software or system. A large system or complex software development might have dozens, hundreds, or more goals, each described by a different use case. Time management and cost budgeting utilizes the use case information, and the resultant estimations are dependent upon the information provided in the use cases.

If a use case is incomplete or does not include the appropriate information or structure, the estimation is likely to be less accurate. If many use cases are incomplete, then the estimation is likely substantially to be inaccurate and unreliable. And, if the use-case inadequacies are not detected and corrected, the requirements identified in the use cases are inadequate to properly identify requirements of the intended computer-system or application.

When the estimate is relied upon, but is inaccurate, cost overruns and low productivity, missed deadlines, loss of business opportunities, loss of customers, loss of referrals, etc are of increased possibilities.

Many times, the author of a use case provides inadequate, or erroneous, information as a result of lack of knowledge of the information required to be included in the use case. As, presently, there generally is no quantitative manner by which quickly to assess the quality of a use case, the author is sometimes unaware of the inadequacy of the use case. And, feedback is not provided to the author to inform the author of the inadequacy of the use case. If the inadequacy of the use case is not corrected before being, it might be too late to take corrective action with respect to the use case or the resulting system. And, even if best use is made of the use case, the resultant estimations are likely to be less accurate, resulting in the aforementioned problems.

If a manner could be provided by which quantitatively to analyze the adequacy of a use case, the use case could be amended to be placed in better form prior to its use for estimation, or other purposes.

It is light of this background information related to use cases that the significant improvements of the present invention have evolved.

SUMMARY OF THE INVENTION

The present invention, accordingly, advantageously provides an apparatus and an associated method, by which to prematurely quantify the quality of a use case that specifies a software, or other system, development requirement.

Through operation of an embodiment of the present invention, a manner is provided by which to analyze a use case to determine its quality.

In one aspect of the present invention, use-case quality rules that quantify acceptable, use-case characteristics are accessed. And, a determination is made as to whether the use case conforms to the use-case quality rules. A use case quality index (UCQI) is calculated. The use case quality index quantifies the extent to which the use case conforms with the use-case quality rules and, hence, the acceptability of the use case. The quantifications, e.g., a numeric value, a grade, an "ok/not ok" indication, or any of various other indications of the extent of conformance of the use case to the rules.

In one aspect of the present invention, use-case quality rules are created and are stored at a quality rules database. Any desired number of quality rules, of any type, are created and stored. The use-case quality rules are subsequently accessed at the database and used to analyze the acceptability of a use case. And, in one implementation, an initial set of use case quality rules is provided.

In another aspect of the present invention, a determiner accesses the quality rules database, or is otherwise provided with the use-case quality rules stored at the database. The determiner determines whether a use case conforms with the use-case quality rules. The determiner, for instance, iterates through each of the use-case quality rules and makes a determination that each iteration of whether the use case conforms with one of the use-case quality rules. A use case might well conform to some of the use-case quality rules but not conform to others of the use-case quality rules.

In another aspect of the present invention, a calculator is provided to calculate a use case quality index that is indicative of the acceptability of the use case that has been analyzed. The calculator, most simply, counts the number of occurrences of non-conformities of the use case. That is to say, most simply, the calculator maintains a count of each time in which a determination is made that a use case does not conform with a use-case quality rule, the count is incremented In another aspect of the present invention, the calculator further weights certain of the use-case count values to be greater or lesser than others of the count values. As compliance with certain of the use-case quality rules are likely to be of particular importance, relative to others of the use-case quality rules, weighting of the results of determinations of the conformity of the use case with the more-important, use-case quality rules, takes into account the unequal importance of various of the quality rules in the resultant count. A weighting factor associated with a use-case quality rule is, e.g., stored together with the use-case quality rule at the quality rules database. When the database is accessed in order to retrieve a stored quality rule for purposes of determination, the weighting factor is also accessed and retrieved. In another aspect of the present invention, both the determining and calculating operations are iteratively performed for each of the use-case quality rules such that, upon determination of whether the use case conforms with a particular use-case quality rule, a calculation is then performed. Subsequent to all iterations of the determination and calculation operations, the final use case quality indication value is obtained.

In another aspect of the present invention, the use case quality index values that are derived are stored in a results database. The results database stores, e.g., all of the use case quality indexes of use cases associated with a particular project.

In another aspect of the present invention, the results of the use-case quality analysis, i.e., determination of conformity with use-case quality rules and calculation of the UCQI, are displayed at a user display. The results are displayable for a quality analysis of a single use case or quality analysis of a plurality of use cases. The use case quality index is displayable, for instance, as part of a drop-down window in a Windows™ or other user-interface environment. In a further implementation, the results of the quality analysis are displayed together with, such as by overlaying upon, the specification of the use case. Interaction between the use case displays and the use-case quality analysis displays permits non-conformities in the use case to be visually, or otherwise, displayed on the display screen of the user interface. Thereby, an author of a use case is provided with feedback as to which portions of the use case fail to conform with the use-case quality rules. Correction can be made to correct the nonconformity. Other reviewers, such as estimators, analogously are able to view the display of the screens of the use case together with a corresponding quality analysis results. Such review, e.g., provides the reviewer with a more extensive explanation of the non-conformities of the use case.

Thereby, a quantitative indication of the conformity of a use case is provided. If a use case is deficient, i.e., fails to conform with use-case quality rules, corrective action can be taken or discounting of the reliability and utility of the use case can be made.

In these and other aspects, therefore, an apparatus, and an associated method, is provided for facilitating quality analysis of a use case. A determiner determines whether the use case conforms with at least a first use-case quality rule. A calculator is configured to calculate a quality index responsive to determination made by the determiner.

A more complete appreciation of the scope of the present invention and the manner in which it achieves the above-noted and other improvements can be obtained by reference to the following detailed description of presently-preferred embodiments taken in connection with the accompanying drawings that are briefly summarized below, and by reference to the appended claims.

BRIEF DESCRIPTION OF THE DRAWINGS

FIG. 9 illustrates another exemplary screen display generated pursuant to a further embodiment of the present invention.

FIG. 10 illustrates another exemplary screen display generated pursuant to a further embodiment of the present invention.

FIG. 12 illustrates another exemplary screen display generated pursuant to a further embodiment of the present invention.

DETAILED DESCRIPTION

Figure 1:
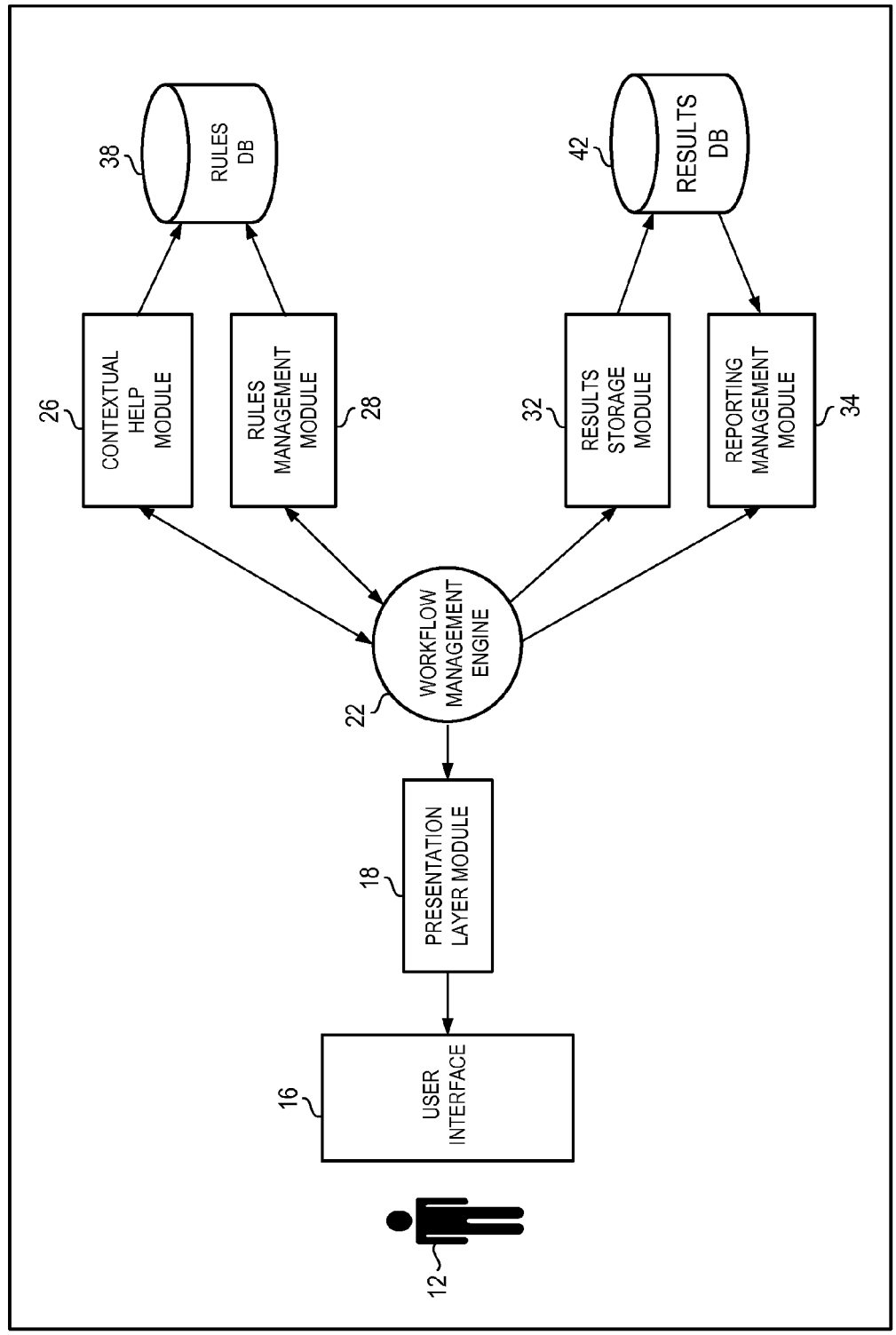
FIG. 1 illustrates a functional block diagram of an embodiment of the present invention.

Referring first to FIG. 1, an arrangement, shown generally at 10, analyzes use cases that are created to describe goals of a software of computer system project. The quality analysis provides an indication of the acceptability of the use cases. In the event that a use case is determined to be inadequate, corrective action can be taken to improve the use case, or the reliance upon the use case can be reduced or discounted. In the exemplary implementation, the arrangement is implemented at a computer work station, such as a Windows™-based work station, or the like. A user 12 is positioned to view the results of the quality analysis and to control the carrying out of the process. In the exemplary implementation, the apparatus facilitates user-analysis of the use case quality. The user views results of the analysis and carriers out the use case quality analysis process. While in the exemplary implantation, the functional elements are embodied at a single physical location, such as the aforementioned computer work station, in other implementations, functionalities provided by the various entities are carried out at different physical locations.

Entities illustrated in FIG. 1 include a user interface 16, a presentation layer module 18, and a work flow management engine 22. The management engine accesses, during its operation, various modules, here further including a contextual help module 26, a quality rules management module 28, a results storage module 32, and a reporting management module 34. A quality rules database 38 and a results database 42 are further shown. The modules 26 and 28 access the quality rules database, and the module 32 and 34 access the results database 42.

In operation, the entities forming the apparatus shown in the arrangement 10 of FIG. 1 are together operable to analyze a use case and to provide an indication of its acceptability. The apparatus is provided with the contents of an already-prepared use case or accesses the contents of a use case during its preparation. Use-case quality rules are accessed from the quality rules database 38, such as through invocation of the quality rules management module 28. The use-case quality rules define acceptable use-case attributes. The use case is analyzed with interaction by the user 12 in a step-by-step manner through the use case to determine whether the use case conforms with the use-case quality rules. In the exemplary implementation, when a noncompliance, i.e., a nonconformity with a use-case quality rule is detected, the nonconforming portion of the use case is highlighted, or otherwise indicated. The display is, e.g., displayed upon a display screen of the user interface 16 through invocation of the presentation layer module 18. A quantification value, a use case quality index, is also created and is indicative of the level of conformity of the use case with the use-case quality rules. The results of the quality analysis, including, e.g., comments, if any, that are added pursuant to the quality analysis, are stored at the results database, such as through invocation of the results storage module 32. The results stored at the results database are subsequently retrievable for further use, as needed.

Figure 2:
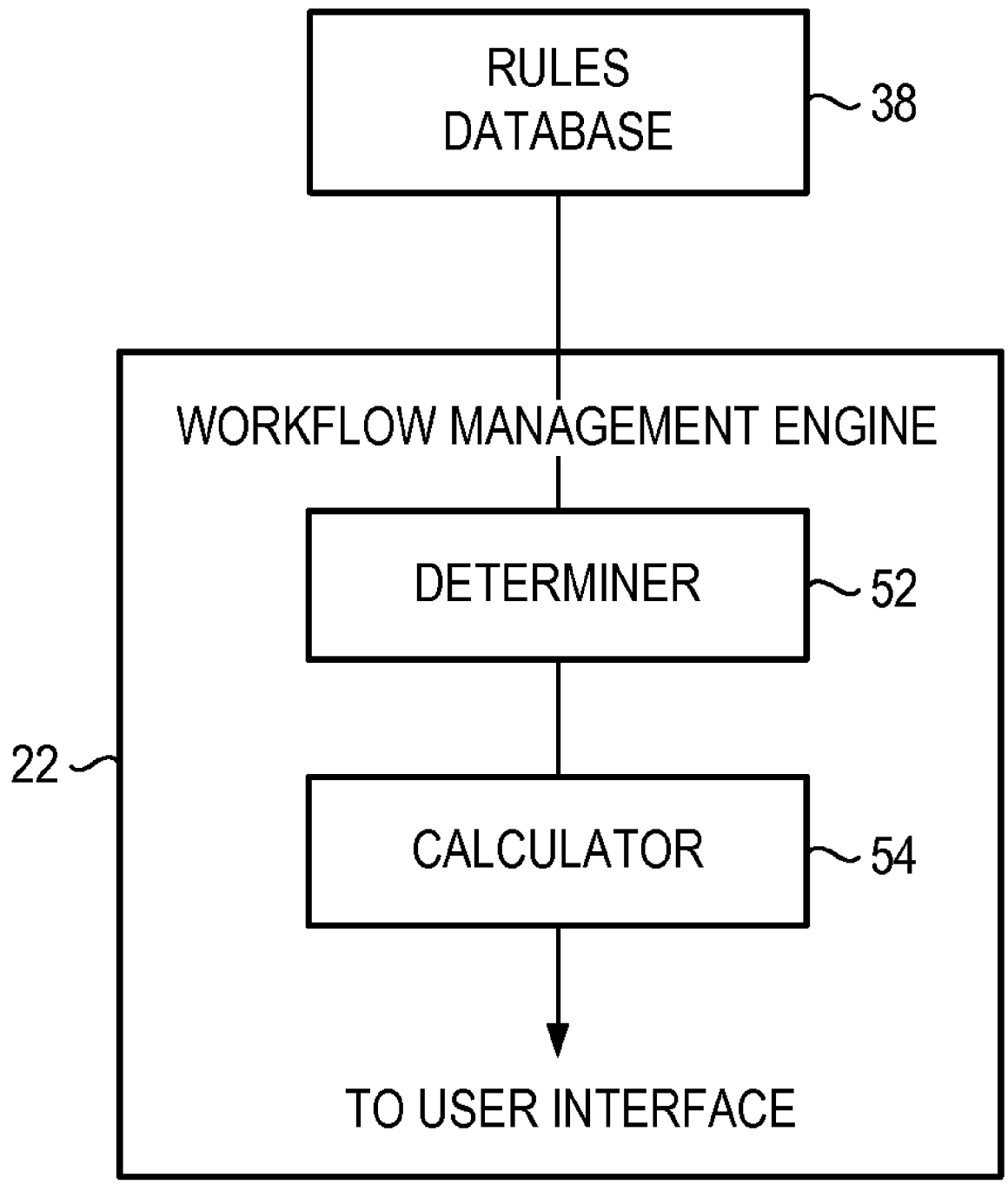
FIG. 2 illustrates a functional block diagram of a portion of FIG. 1.

FIG. 2 illustrates a representation of the work flow management engine 22 that forms part of the apparatus shown in the arrangement 10 of FIG. 1. The work flow management engine is functionally represented. And, here, the work flow management engine includes a determiner 52 and a calculator 54. The engine 22 is connected to, or is otherwise capable of accessing, the quality rules-database 38. In the exemplary implementation, the database 38 contains an initial set of rules, subsequently amendable or changeable by the user. Quality analysis is performed in order to identify conformity of a use case with the use-case quality rules maintained at the quality rules database. The use case that is to be analyzed is also accessed. The determiner operates to determine for each use-case quality rule, whether the use case undergoing quality analysis conforms with the quality rule. Determination is made as to whether the use case does not conform with the quality rule. Indications of determinations made by the determiner are provided to the calculator 54, each time a noncompliance is indicated. The calculator operates at least to calculate a use case quality index (UCQI) that is representative of the extent of conformity of the analyzed use case with the use-case quality rules. The UCQI is, e.g., a numeric value. Alternately, the UCQI is non-numeric value, e.g., a grade, an indication of the use case being acceptable ("ok") or unacceptable ("not ok") or any other indication that identifiers conformance with the rules. The work flow management engine is amenable to manage multiple use cases, such as each of a plurality use cases associated with a software or system development project. Determinations and calculations are iteratively performed pursuant to quality analysis of each of the use cases. And, in this operation, the calculator is further operable, e.g., to manipulate further the use case quality index value to form a cumulative value, such as a total or average value of the cumulative use cases that are analyzed. The cumulative value represents, e.g., a confidence level of the validity and completeness of the use case. In the event that the calculated use case quality index or indexes indicate low levels of conformity with the use-case quality rules, changes to the use case are required, or its usefulness in the estimation is discounted. Conversely, if the cumulative or average use case quality indices indicate that the use cases are generally in conformity with the use-case quality rules, then the resultant estimation of the software or system development project is accorded a higher level of confidence.

In the exemplary implementation in which, when a use case is analyzed, areas of nonconformity with the use-case quality rules are highlighted and displayed to a viewer, such as the author of the use case, corrective action can be made to amend the use case. Thereby, by highlighting or alerting the author, or other person able to amend the use case, of nonconforming aspects of the use case, the use case can be amended to improve the use case and place it in better conformity with the use-case quality rules. Better use of the use case is then able to be made.

Figure 3:
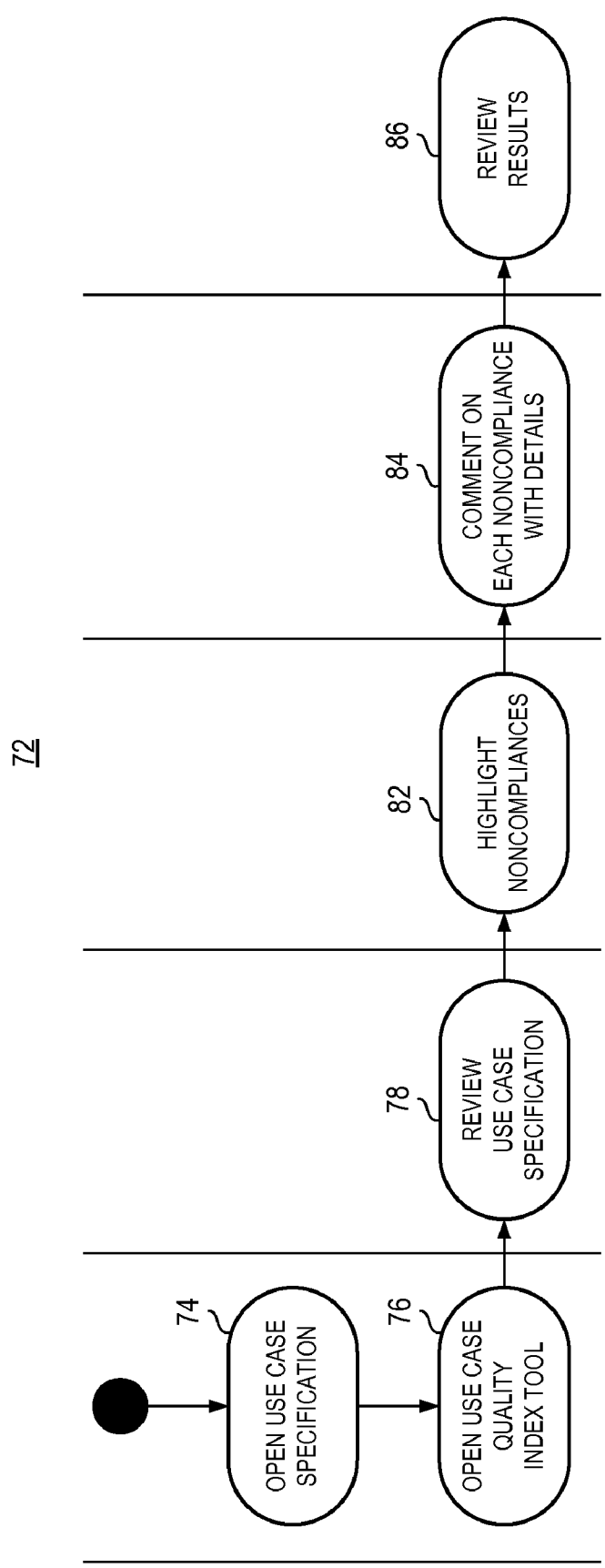
FIG. 3 illustrates a process representation of the process of operation of an embodiment of the present invention.

FIG. 3 illustrates a process diagram, shown generally at 72, representative of the process of operation of an embodiment of the present invention. The process facilitates quality analysis of a use case that identifies and describes a software or system goal.

First, and as indicated by the block 74, a user opens a use case specification at a computer work station and activates a use case quality index guiding tool that analyzes a use case, indicated by the block 76.

Then, as indicated by the block 78, the use case quality index tool guides the user through a review of the specification of the use case. And, as indicated by the block 82, each non-compliance that is ascertained is highlighted. The user that is viewing the specification, in one implementation, highlights the non-compliance and, as indicated by the block 84, further adds comments to the highlighted non-compliance area. And, as indicated by the block 86, the use case quality index tool generates a report that includes a quality index of the use case together with a description of detected problems, i.e., detected non conformities with the use-case quality rules.

The continuous use of the process and the metrics registration provides an alternate statistical indicia that facilitates determination of whether, e.g., construction phase reworking is required. Further, the use case quality index is used in any of various manners, for instance, the value is used as a risk analysis parameter to determine the probability of a software development project of being successful without deviations or within an allowable range of deviations. The value is also used as a factor in predictions of quality problems in design, coding, or integration phases of a software development project. The value is also usable to compare specifications of use cases with minimum quality levels defined by the use case quality rules. Use cases are accepted or rejected according to the thresholds. The calculated value is further used to identify which, if any, portions of a use case need to be corrected or, more generally, across a group of use cases, where to exert efforts to improve their quality. Additionally, the value is used to provide indicia of comparison across different projects, geographies, industries, etc. and then relating the metric to project performance, estimates, risks, service excellence levels, etc. And, the value is used pursuant to new project estimation to reduce variance related to quality requirements and better to achieve completeness.

Figure 4:
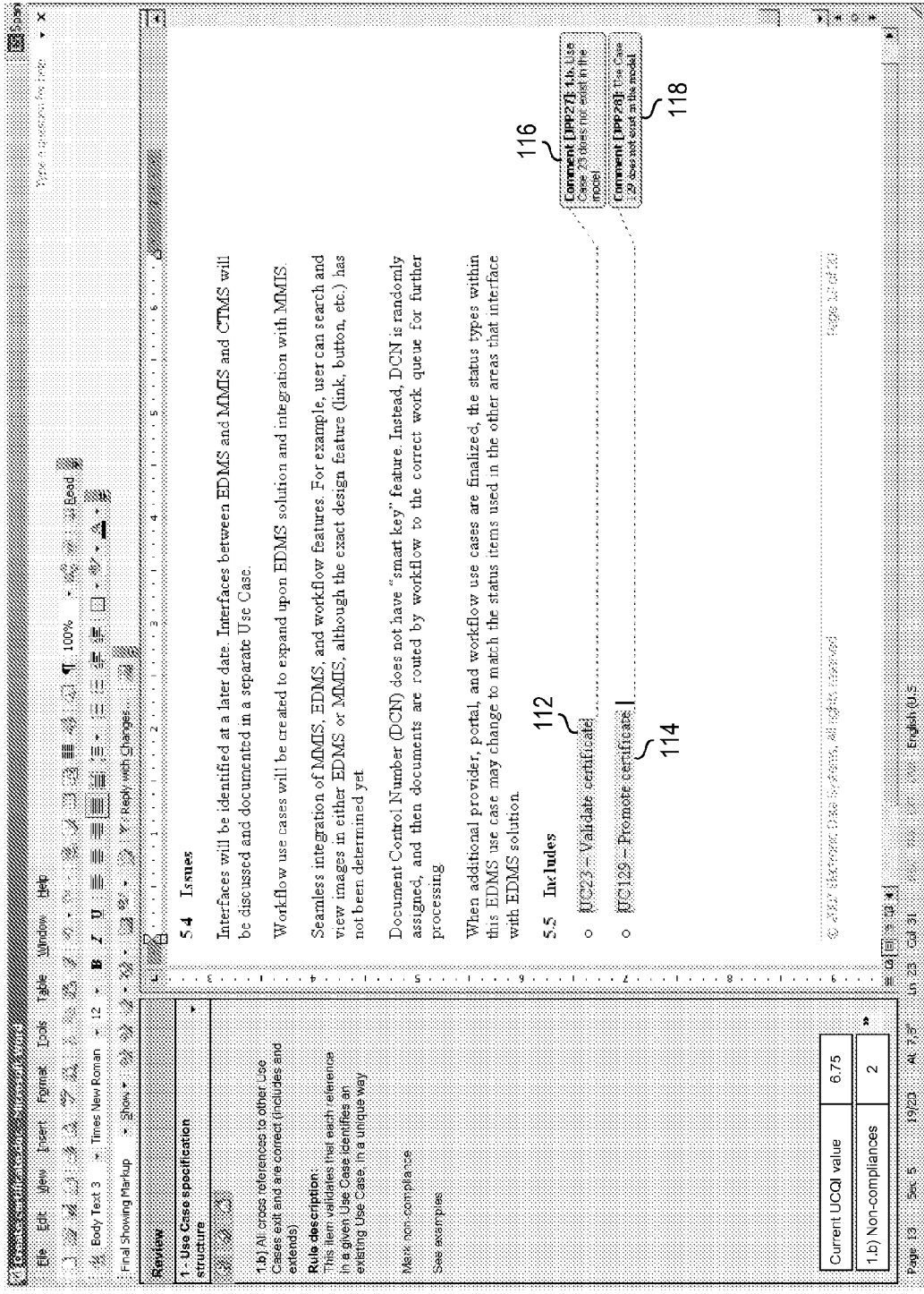
FIG. 4 illustrates an exemplary screen display generated during operation of an embodiment of the present invention.

FIG. 4 illustrates an exemplary screen display, shown generally at 102, generated pursuant to operation of an embodiment of the present invention. The screen display is displayed upon, e.g., a display screen of a user interface, such as the user interface 16 shown in FIG. 1 responsive to execution of the presentation layer module (also shown in FIG. 1) by the work flow management engine. The display 102 is part of a windows-based, display generation. Here, a UCQI (Use Case Quality Index) tool bar 106 is shown at the left-hand side (as shown) of the display. And, a page 108 of the specification of the use case is shown at the right-hand side (as shown) of the display. Here, non conformities 112 and 114 are highlighted, and comments 116 and 118 associated with the nonconformities are also illustrated in the display. The tool bar 106 indicates the quality rule associated with the non conformities and also includes a numerical count of the non-compliances for this particular quality rule.

Figure 5:
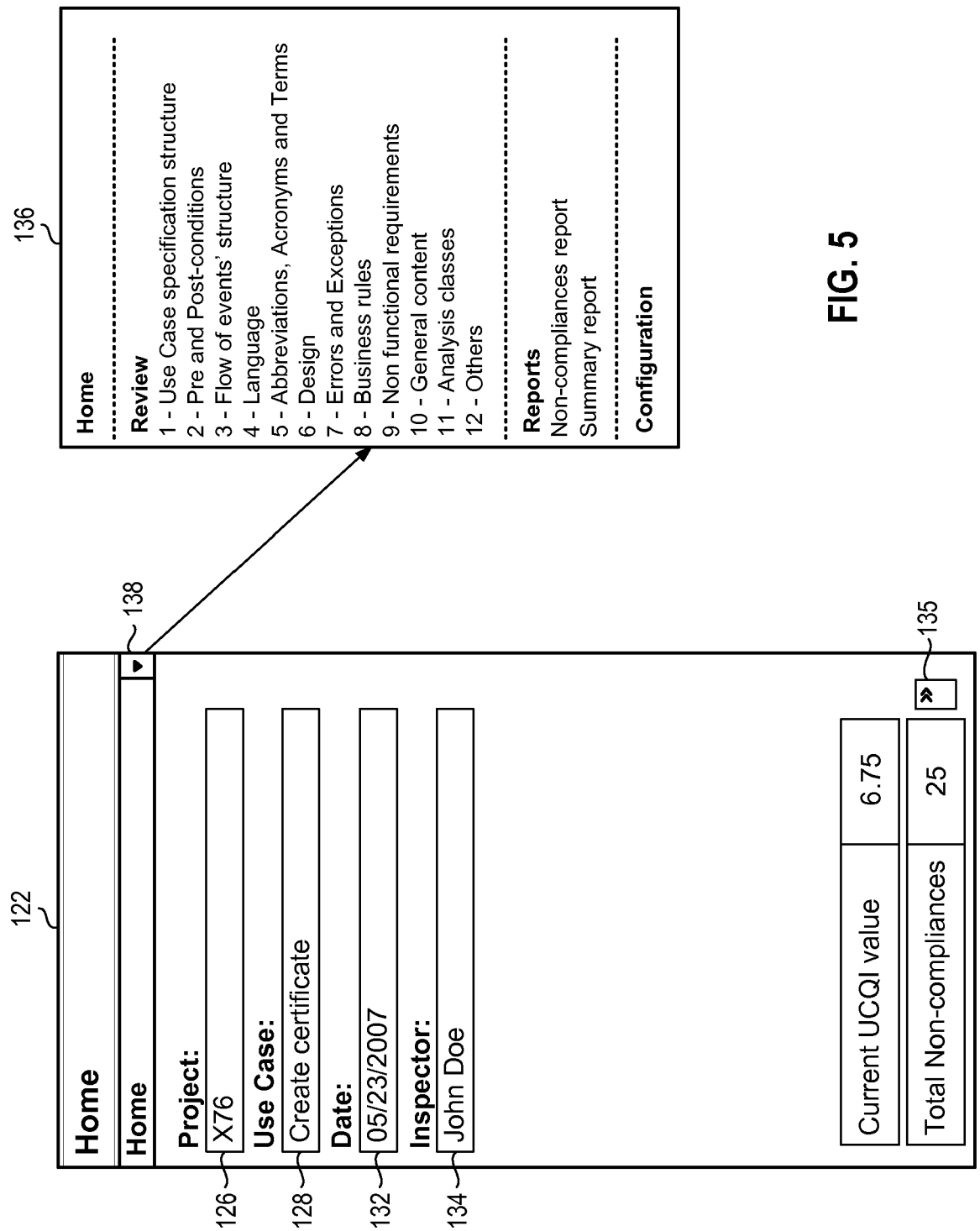
FIG. 5 illustrates another exemplary screen display generated pursuant to operation of a further embodiment of the present invention.

FIG. 5 illustrates an exemplary, home-view, of a usage UI tool bar, here shown at 122, generated pursuant to operation of an embodiment of the present invention. The tool bar here again includes the total count of the non compliances and, here, also includes header data information such as the project identification 126, a title 128 of the use case, a date indication 132, and an inspector identification 134. A total non-value indication link 135, along side a total non-compliances value also forms part of the toolbar. The home tool bar has a drop down menu 136 that defines a main menu with a plurality of menu selections.

Figure 6:
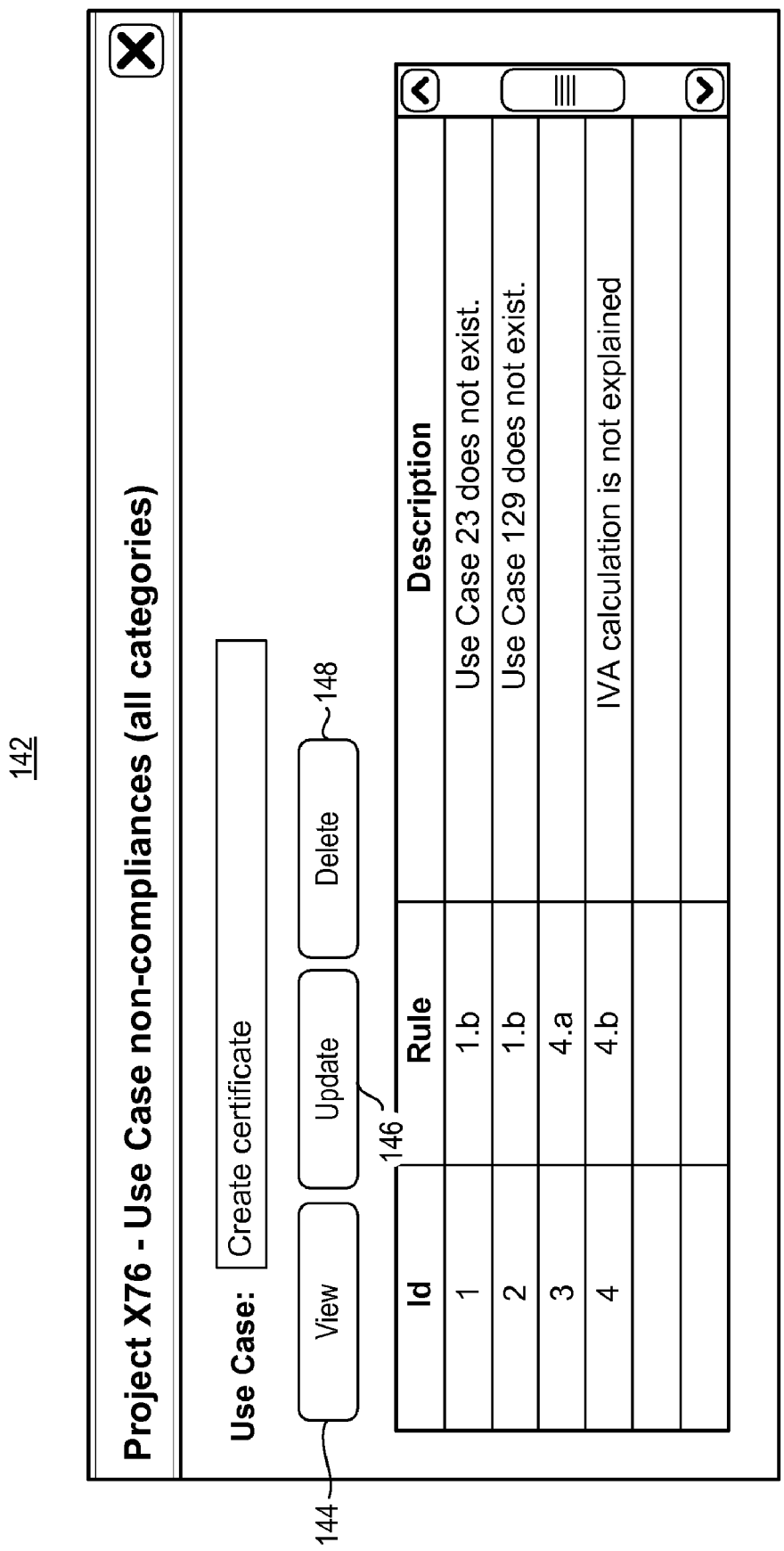
FIG. 6 illustrates another exemplary screen display generated pursuant to a further embodiment of the present invention.

FIG. 6 illustrates a further display generated pursuant to operation of an embodiment of the present invention. The display, shown at 142, a listing of non-compliances that are identified in the use case displayed. The display 142 is provided on the user interface upon selection of the non-compliances link 135 of the toolbar 122 shown in FIG. 5. The listing includes all non-compliances when a specific validation category is not selected. And, the listing shows only the non-compliances that are identified in a category when a specific category is selected. A view control 144 is used to facilitate navigation through the specification of the use case to show the location of the corresponding non-compliance. The update control 146 facilitates navigation to the associated non-compliance in the use case specification and shows the mark non-compliance window in the UCQI tool bar (FIG. 9). The delete control 148 facilitates navigation to the location of the non-compliance in the use case specification and to delete the non compliance (FIG. 9).

Figure 7:
FIG. 7 illustrates yet another exemplary screen display generated pursuant to a further embodiment of the present invention.

FIG. 7 illustrates a review-view menu, shown generally at 152. The review-view menu is a drop down menu that includes menu selections that provide for validation of a specific quality rule category in the specification of the use case.

Figure 8:
FIG. 8 illustrates another exemplary screen display generated pursuant to a further embodiment of the present invention.

FIG. 8 illustrates a further menu, shown generally at 156, representative of a display responsive to selection of the use case specification structure from the menu 152, shown in FIG. 7. Here, review of the use case specification and entry of non-compliances is facilitated. The non-compliance count pertain, here, only to the current use-case non compliance. The controls 158 are used to navigate to the next or to the previous quality rule within the same category and also to navigate to a categories list.

FIG. 9 illustrates another display 156 that further includes a window 162 permitting entry of comments associated with the non-compliance.

FIG. 10 illustrates additional display, here shown at 172, that illustrates a manner by which to mark a non-compliance using a contextual menu as well as a manner by which to update an already-marked non compliance. A document control number (DCN) is assigned, such as by random assignation, and the documents are then routed by work flow to a correct work hue for further processing. When additional provider, portal, and work flow use cases are finalized, the status types within, e.g., EDMS (Electronic Document Management System)-type use case changes, if needed, to match the status items used in other areas that interface with EDMS solutions. Here, the menu 174 includes a use case category quality rule menu entry that, if selected, causes an additional menu 176 with associated quality rules to be displayed.

Figure 11:
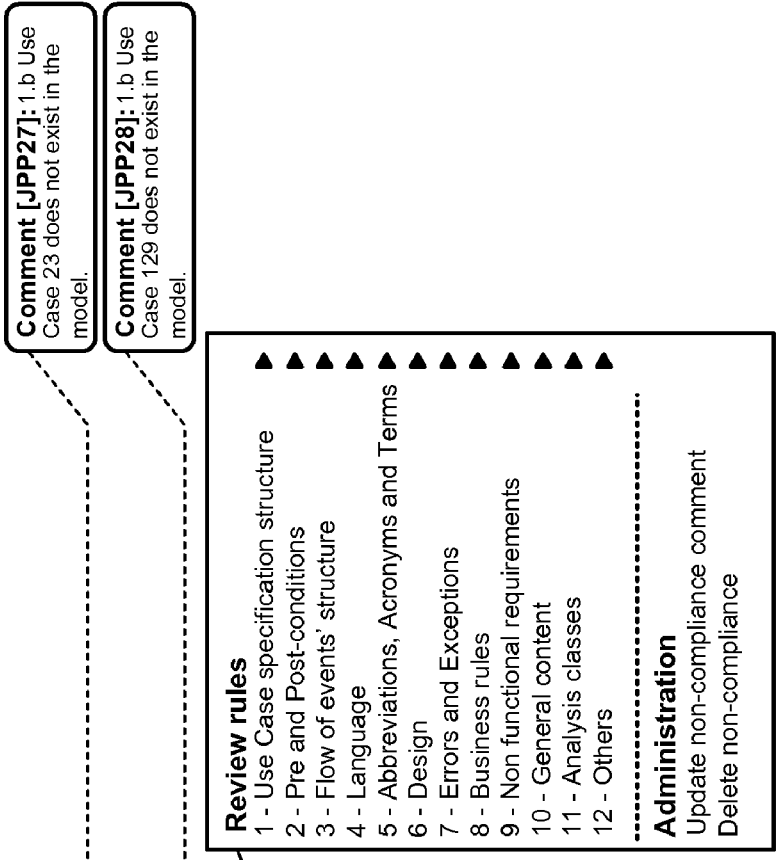
FIG. 11 illustrates another exemplary screen display generated pursuant to a further embodiment of the present invention.

FIG. 11 illustrates another display, shown generally at 182, representative of a review quality rules menu that lists quality rules and permits changes to current use case indicated non-compliances.

FIG. 12 illustrates a menu, shown generally at 186 representative of a tool report view at which validation reports are created. A non-compliance report 188 selected from the view 186 includes information related to the non-compliance grouped by non-compliances category.

Figure 13:
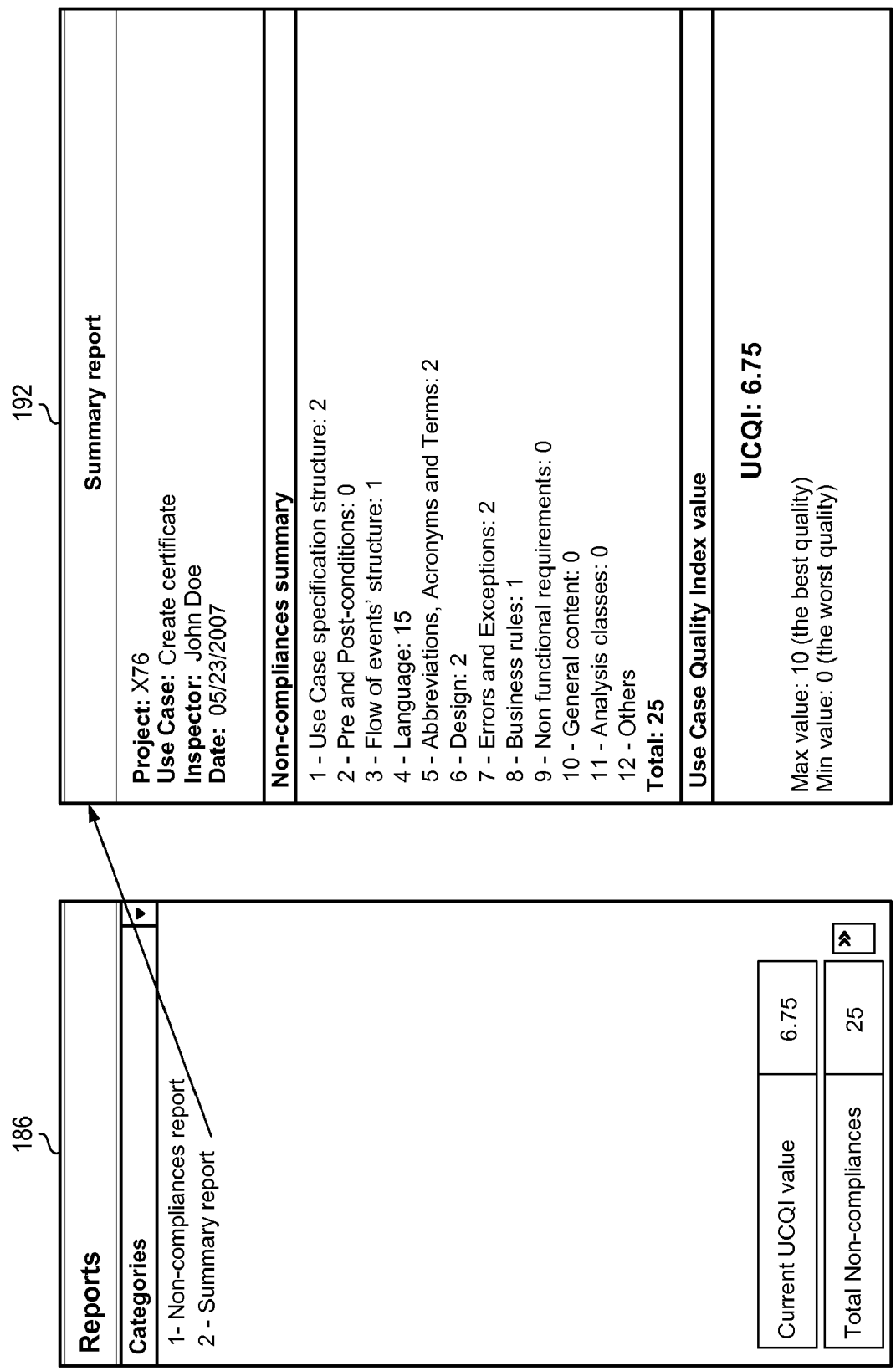
FIG. 13 illustrates another exemplary screen display generated pursuant to a further embodiment of the present invention.

FIG. 13 again illustrates the tool report view 186 in which here, a summary report view 192 is selected from the tool bar. The validation summary report provides a summary of the non compliances per category quality rule.

Thereby, through use of an embodiment of the present invention, a manner is provided by which to quantify the conformity of specifications of use cases to a set of use case quality rules. A quantitative indication of the compliance of a use case to quantifiable standards is thereby provided.

Presently preferred embodiments of the invention and many of its improvements and advantages have been described with a degree of particularity. The description is of preferred examples of implementing the invention and the description of preferred examples is not necessarily intended to limit the scope of the invention. The scope of the invention is defined by the following claims.

What is claimed is:

1. An apparatus for facilitating quality analysis of a use case, said apparatus comprising:
a determiner configured to permit determination of whether the use case conforms with at least a first use-case quality rule; and
a calculator configured to calculate a quality index responsive to determination made by said determiner.

2. The apparatus of claim 1 wherein said determiner is configured to permit determination of whether the use case conforms with a plurality of use-case quality rules.

3. The apparatus of claim 2 wherein said calculator is configured to calculate a quality index responsive to determinations made by said determiner for the plurality of use-case quality rules.

4. The apparatus of claim 3 wherein said determiner and said calculator are enabled iteratively to determine, for each use-case quality rule of the plurality, non-conformity of the use case and to calculate, respectively, a quality index, for each use-case quality rule of the plurality.

5. The apparatus of claim 4 wherein said calculator is further configured to calculate a cumulative use case quality index representative of conformity of the use case with the plurality of use-case quality rules.

6. The apparatus of claim 1 further comprising a quality rules database configured to store at least the first use-case quality rule.

7. The apparatus of claim 1 further comprising a user interface configured to display in human perceptible form an indication of calculation made by said calculator.

8. The apparatus of claim 7 wherein said user interface is further configured to display indication of determination made by said determiner of nonconformity of the use case within a use case with the at least the use-case quality rule.

9. The apparatus of claim 8 wherein said user interface is further configured to display at least part of the use case.

10. The apparatus of claim 9 wherein said user interface is further configured to display the indication of the determination of the nonconformity together with display of the at least part of the use cause where the nonconformity is identified.

11. The apparatus of claim 1 further comprising a results database configured to store indications of calculations made by said calculator.

12. The apparatus of claim 1 wherein the first use-case quality rule further has associated therewith an impact value and wherein the quality index calculated by said calculator is further responsive to the impact value.

13. A method for facilitating quality analysis of a use case, said method comprising:
determining whether the use case conforms with at least a first use-case quality rule; and
calculating a quality index responsive to determination made during said determining.

14. The method of claim 13 wherein said determining further comprises determining whether the use case conforms with a plurality of use case quality rules.

15. The method of claim 14 wherein said calculating further comprises calculating whether the use case conforms with the plurality of use case quality rules.

16. The method of claim 15 further comprising providing an initial set of quality rules, each quality rule having an associated noncompliance impact.

17. The method of claim 13 further comprising displaying an indication of the quality index.

18. The method of claim 17 wherein said displaying further comprises displaying part of the use case together with an indication of non-conformity, if any, with the at least the first use-case quality rule.

19. The method of claim 13 further comprising the operation of storing the at least the first use-case quality rule at a quality rules database; and wherein said determining further comprises access the quality rules database to retrieve the at least the first use-case quality rule.

20. A method for facilitating system estimation, said method comprising:
creating a plurality of use-case quality rules;
determining whether a use case representative of a system goal conforms with the plurality of use-case quality rule; and
quantifying conformity of the use case with the use-case quality rules determined during said determining.

* * * * *

UNITED STATES PATENT AND TRADEMARK OFFICE
CERTIFICATE OF CORRECTION

| | | |
|---|---|---|
| PATENT NO. | : 7,970,726 B2 | Page 1 of 1 |
| APPLICATION NO. | : 12/118361 | |
| DATED | : June 28, 2011 | |
| INVENTOR(S) | : Luis E. Infanti et al. | |

It is certified that error appears in the above-identified patent and that said Letters Patent is hereby corrected as shown below:

In column 9, line 8, in Claim 10, delete "cause" and insert -- case --, therefor.

Signed and Sealed this
Third Day of January, 2012

David J. Kappos
*Director of the United States Patent and Trademark Office*